(12) United States Patent
Kajimoto

(10) Patent No.: US 10,713,942 B2
(45) Date of Patent: Jul. 14, 2020

(54) DISPLAY CONTROL DEVICE AND DISPLAY CONTROL METHOD

(71) Applicant: DENSO TEN Limited, Kobe-shi, Hyogo (JP)

(72) Inventor: Nobuaki Kajimoto, Kobe (JP)

(73) Assignee: DENSO TEN LIMITED, Kobe-shi (JP)

(*) Notice: Subject to any disclaimer, the term of this patent is extended or adjusted under 35 U.S.C. 154(b) by 20 days.

(21) Appl. No.: 15/914,998

(22) Filed: Mar. 7, 2018

(65) Prior Publication Data

US 2018/0336783 A1  Nov. 22, 2018

(30) Foreign Application Priority Data

May 17, 2017  (JP) .................. 2017-098419

(51) Int. Cl.
*H04N 7/00* (2011.01)
*G08G 1/0968* (2006.01)
*G08G 1/0969* (2006.01)
*G01C 21/20* (2006.01)
*B62D 15/02* (2006.01)
*G08G 1/16* (2006.01)

(52) U.S. Cl.
CPC ... *G08G 1/096827* (2013.01); *B62D 15/0275* (2013.01); *G01C 21/20* (2013.01); *G08G 1/0969* (2013.01); *G08G 1/167* (2013.01)

(58) Field of Classification Search
CPC  B62D 15/028; B62D 15/027; B62D 15/0275; B62D 15/0285; B60R 1/00; B60R 2300/305; B60R 2300/806; B60R 11/04; B60R 2300/105; B60R 2300/301; B60R 2300/302; B60R 2300/804; B60R 2300/8086; B60R 2300/8093; B60R 1/1207; B60R 2001/1215; B60R 2001/1253
USPC ........................................... 348/113
See application file for complete search history.

(56) References Cited

U.S. PATENT DOCUMENTS

2014/0333455 A1* 11/2014 Lee ............... B62D 15/027
340/932.2

FOREIGN PATENT DOCUMENTS

| JP | 2003-163925 A | | 6/2003 |
| JP | 2009-284023 A | | 12/2009 |
| JP | 2010-069916 A | | 4/2010 |
| JP | 2010069916 A | * | 4/2010 |
| JP | 2012-216997 A | | 11/2012 |
| JP | 2014-088128 A | | 5/2014 |

* cited by examiner

*Primary Examiner* — Masum Billah
(74) *Attorney, Agent, or Firm* — Oliff PLC

(57) ABSTRACT

There is provided a display control device having first and second processing unit. When a traveling state of a vehicle indicated by a vehicle signal, which is acquired at a point of time at which an additional information generated by the second processing unit can be output, is not a predetermined state, at least one of an output of an additional image by the second processing unit and a superimposition of the additional image is prohibited.

6 Claims, 7 Drawing Sheets

DISPLAY CONTROL DEVICE AND DISPLAY CONTROL METHOD

CROSS-REFERENCE TO RELATED APPLICATIONS

This application is based on and claims priority under 35 USC 119 from Japanese Patent Application No. 2017-98419 filed on May 17, 2017.

TECHNICAL FIELD

The present disclosure relates to a display control device and a display control method.

BACKGROUND

In the related art, a display system has been widely known which superimposes a guide line indicative of a traveling direction of a vehicle on an image of a vehicle rear and displays the same on a display when moving backward a vehicle such as an automobile and parking the vehicle in a parking space (for example, refer to Patent Document 1). The display system is generally configured to share the display with a navigation system and an audio system and to switch an image to be displayed on the display in correspondence to a shift position of the vehicle. For example, when a driver changes the shift position to a reverse position, the display system displays the rear image on the display. Also, when the driver changes the shift position to a position other than the reverse position, the display system displays an image of the navigation system, the audio system or the like on the display.

The display system includes, for example, a rear camera configured to capture the rear of the vehicle, a microcomputer (hereinafter, also referred to as 'main microcomputer') configured to select an image to be displayed on a display device in correspondence to the shift position, a microcomputer (hereinafter, also referred to as 'sub-microcomputer') configured to depict a guide line, and a display controller configured to enable the main microcomputer to display the selected image on the display device. The main microcomputer is configured to acquire a vehicle signal indicative of the shift position of the vehicle. When it is detected that the shift position becomes the reverse position, the main microcomputer selects the rear image captured by the rear camera, instead of an image upon forward movement, and instructs the sub-microcomputer to depict the guide line. The display controller enables the main microcomputer to superimpose the guide line depicted by the sub-microcomputer on the selected rear image and to display the same on the display device.

Patent Document 1: JP-A-2012-216997
Patent Document 2: JP-A-2009-284023
Patent Document 3: JP-A-2014-88128

In the case of the display system as described above, a time lag occurs after it is detected that the shift position becomes the reverse position and the main microcomputer selects the rear image until the sub-microcomputer generates the guide line. Therefore, when the shift position is changed during the time lag, an appropriate image may not be output. For example, when the shift position becomes a position other than the reverse position, the main microcomputer cancels the display of the rear image and the sub-microcomputer outputs the guide line depicted in accordance with the instruction before the change. If such a situation occurs, the guide line is superimposed on an image other than the rear image, so that an abnormal image is displayed.

SUMMARY

It is therefore an object of the present disclosure to provide a technology capable of displaying an appropriate image even when a vehicle signal is changed in a short time.

According to an aspect of the embodiments of the present invention, there is provided a display control device including: a first processing unit configured to select an image, which is to be displayed on a display device, of images to be supplied from a plurality of supply sources, based on a vehicle signal indicative of a traveling state of a vehicle; a second processing unit configured to generate additional information to be displayed with being superimposed on the image, and a display controller configured to superimpose the additional information, which is output from the second processing unit, on the image selected by the first processing unit and to display both of the image and the additional information on the display device. When the traveling state of the vehicle indicated by the vehicle signal, which is acquired at a point of time at which the additional information generated by the second processing unit can be output, is not a predetermined state, at least one of an output of an additional image by the second processing unit and a superimposition of the additional image on the image by the display controller is prohibited.

According to an aspect of the embodiments of the present invention, there is provided a display control method that is to be executed by a display control device, the method including: selecting an image by a first processing unit, which is to be displayed on a display device, of images to be supplied from a plurality of supply sources, based on a vehicle signal indicative of a traveling state of a vehicle; generating additional information to be displayed with being superimposed on the image, by a second processing unit, and superimposing the additional information using a display controller, which is output from the second processing unit, on the image selected by the first processing unit and to display both of the image and the additional information on the display device. When the traveling state of the vehicle indicated by the vehicle signal, which is acquired at a point of time at which the additional information generated by the second processing unit can be output, is not a predetermined state, at least one of an output of an additional image by the second processing unit and a superimposition of the additional image on the image by the display controller is prohibited.

According to the present disclosure, it is possible to provide the technology capable of displaying the appropriate image even when the vehicle signal is changed in a short time.

BRIEF DESCRIPTION OF THE DRAWINGS

Exemplary embodiments of the present invention will be described in detail based on the following figures, wherein.

DETAILED DESCRIPTION

Hereinafter, illustrative embodiments of the present disclosure will be described with reference to the drawings. In the meantime, the illustrative embodiments to be described later are just exemplary, and the present disclosure is not limited thereto.

First Illustrative Embodiment

Figure 1:
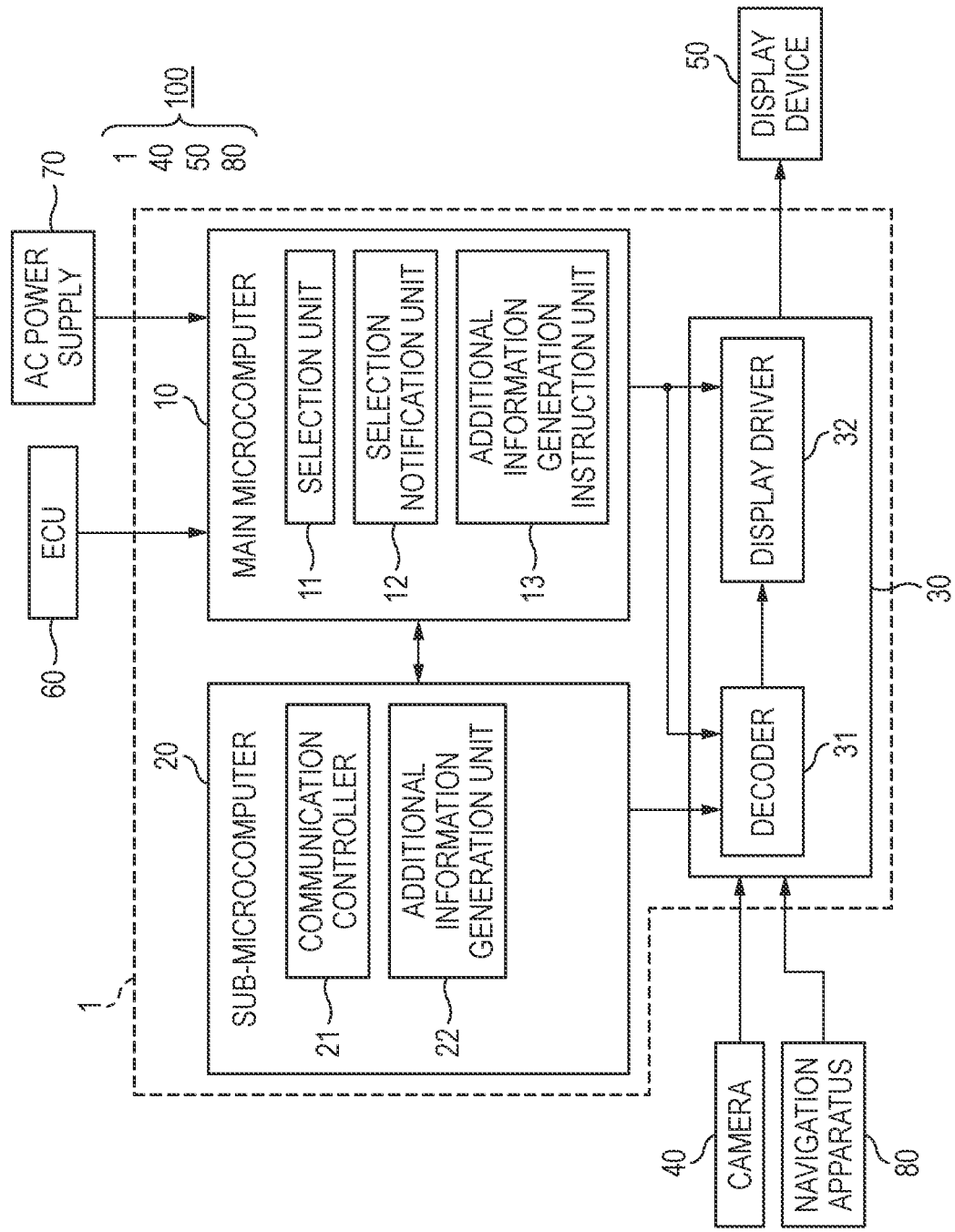
FIG. 1 is a block diagram depicting a configuration of a display system in accordance with a first illustrative embodiment.

FIG. 1 is a block diagram depicting a configuration of a display system 100 in accordance with a first illustrative embodiment. The display system 100 is mounted on a vehicle, and is configured to selectively display images of a navigation apparatus 80, a camera 40 configured to capture a surrounding of the vehicle, and the like.

As shown in FIG. 1, the display system 100 includes a display control device 1, a camera 40, a display device 50, and a navigation apparatus 80. The camera 40 is an imaging apparatus configured to capture a surrounding of the vehicle, and is configured to capture at least a predetermined direction of the vehicle, for example, a rear image, in the first illustrative embodiment. The camera 40 is a so-called rear camera provided at a rear part of the vehicle, and has an imaging lens (not shown) of which an optical axis is arranged to face toward the rear of the vehicle. The present disclosure is not limited thereto. For example, the camera 40 may be configured by a plurality of cameras such as a side camera configured to capture a side of the vehicle, a front camera configured to capture the front of the vehicle, and the like, including the rear camera.

The navigation apparatus 80 is to perform a guide (navigation) relating to the vehicle traveling by displaying information such as a map around the vehicle, a current position of the vehicle, a route to a destination and the like for a user such as a driver and a passenger. The navigation apparatus 80 has a function of receiving signals from GPS (Global Positioning System) satellites to obtain a position of the own vehicle, a function of calculating a route from a position of the own vehicle to a destination by referring to a database having map information stored therein and the map information, and the like. In the meantime, since the well-known configuration can be adopted for the navigation apparatus 80, the detailed descriptions of the navigation apparatus 80 are omitted. Meanwhile, the navigation apparatus 80 of the first illustrative embodiment may also be an audio/visual/navigation integrated electronic device (also referred to as 'AVN device') having an audio function of reproducing a music and a visual function of reproducing a moving picture and displaying a television broadcasting.

The display device 50 includes a display element (not shown) such as a liquid crystal display element and an organic EL (Electro-Luminescence) panel, and is configured to display an image. Also, the display device 50 includes a touch panel (not shown) superimposed on a display area of the display element.

An ECU (electronic control unit) 60 has functions of detecting a shift position of the vehicle and providing a signal indicative of the shift position to the display control device 1, as a vehicle signal indicative of a traveling state of the vehicle. In the meantime, when the vehicle is an electric vehicle, the vehicle signal may be information mainly indicative of the traveling state of the vehicle such as a drive (forward movement), a reverse (backward movement) and a parking (a state where the vehicle does not move forward nor backward), which is selected by a driver's operation on a selection lever or the like. In the first illustrative embodiment, the drive, the reverse and the parking of the electric vehicle are also referred to as the shift position, for convenience sake. Also, in the display system 100 of the first illustrative embodiment, the display is switched between a case where the reverse position (backward movement) is selected as the shift position and a case where a position other than the reverse position is selected as the shift position. Therefore, the vehicle signal that is to be provided to the display control device 1 may be a signal indicating whether the shift position is the reverse position or a position other than the reverse position.

The display control device 1 includes a main microcomputer 10, a sub-microcomputer 20, and a display controller 30. The main microcomputer 10 is configured to select an image that is to be displayed on the display device 50, based on the vehicle signal. Also, the main microcomputer 10 is configured to instruct the sub-microcomputer to generate additional information, based on the vehicle signal. The main microcomputer 10 of the first illustrative embodiment is an example of the first processing unit.

The main microcomputer 10 includes a selection unit 11, a selection notification unit 12, and an additional information generation instruction unit 13. The selection unit 11 is configured to acquire the vehicle signal from the ECU 60, and to select an image that is to be displayed on the display device, based on the vehicle signal. For example, when the traveling state of the vehicle indicated by the vehicle signal is a predetermined state, for example, a reverse position, in the first illustrative embodiment, the selection unit 11 selects an image (rear image) captured by the camera 40, and when the vehicle signal indicates a position other than the reverse position, the selection unit 11 selects an image other than the image (rear image) captured by the camera 40.

Also, when a completion notification, which indicates that the generation of the additional information is completed, is received from the sub-microcomputer 20, the selection unit 11 acquires a vehicle signal, and when the traveling direction of the vehicle indicated by the corresponding vehicle signal is different from a traveling direction of the vehicle, which is indicated by the vehicle signal when the image is selected, the selection unit 11 transmits a superimposition prohibition signal to the display controller 30 so as to prevent the display controller 30 from superimposing an additional image on the captured image.

The selection notification unit 12 is configured to notify the display controller of a selection signal, which indicates that the captured image is selected. The additional information generation instruction unit 13 is configured to instruct the sub-microcomputer 20 to generate the additional information.

The sub-microcomputer 20 includes a communication controller 21 configured to perform communication with the other device and an additional information generation unit 22 configured to generate the additional information. The communication controller 21 is configured to perform communication with the other device such as the main microcomputer 10 and the display controller 30. The additional information generation unit 22 is configured to acquire the vehicle signal from the main microcomputer 10 via the communication controller 21, and to generate the additional information to be displayed with being superimposed on an image, based on the vehicle signal. For example, when the vehicle signal indicates the reverse position, the additional information generation unit 22 generates a guide line, which is to be superimposed on the image captured by the camera 40, and when the vehicle signal indicates a position other than the reverse position, the additional information generation unit 22 does not generate the additional information. In the first illustrative embodiment, the sub-microcomputer 20 is an example of the second processing unit.

The display controller 30 includes a decoder 31 and a display driver 32. The display driver 32 is a drive circuit configured to display an image, which is to be output from the decoder 31 under control of the main microcomputer 10, on the display device 50, and is configured by an ASIC (application specific integrated circuit), in the first illustrative embodiment.

The decoder 31 is configured to decode an image, which is selected by the main microcomputer 10, of images to be output from the camera 40 and the navigation apparatus 80, and to convert the same into an image signal having a format to be displayed on the display device 50. Also, the decoder 31 is configured to superimpose the additional information, which is generated by the sub-microcomputer 20, on the image selected by the main microcomputer 10 and to display the same on the display device 50.

Figure 2A:
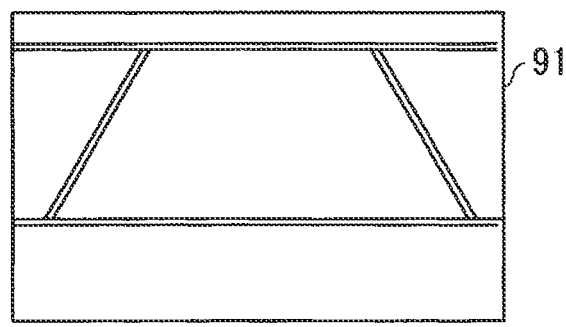
FIG. 2A, FIG. 2B and FIG. 2C depict an example where additional information is superimposed on an image.
Figure 2B:
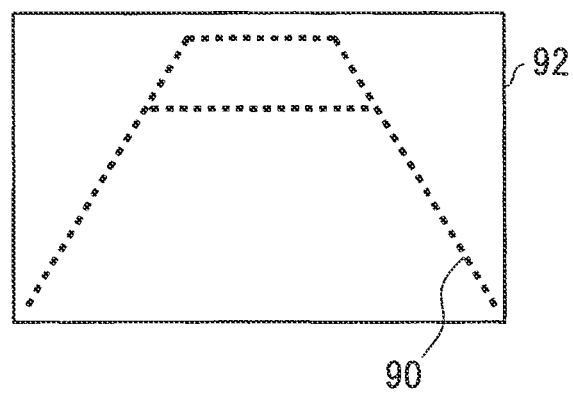
Figure 2C:
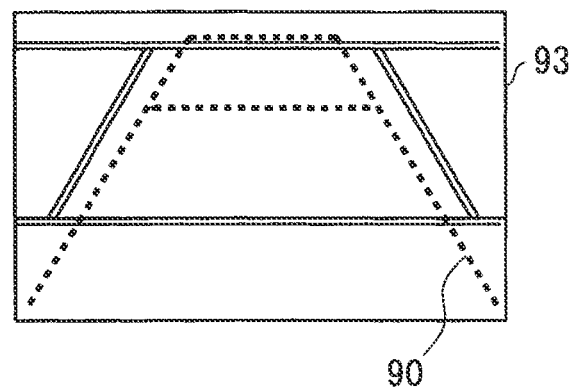

FIG. 2 depicts an example where the additional information is superimposed on an image. FIG. 2A depicts a captured image 91 obtained by capturing the rear of the vehicle with the camera 40. FIG. 2B depicts an image 92 including the additional information generated by the sub-microcomputer 20. In the example of FIG. 2B, a guide line 90 shown with a broken line is the additional information. The display controller 30 sets a part of the image 92 except the guide line 90 to a transparent color, and synthesizes the image 92 on the image 91. FIG. 2C depicts an example of an image 93 in which the additional information is superimposed on the image 91. In the meantime, the additional information is not limited to the guide line, and may be a figure indicative of a direction of a tire of the own vehicle, a shading for highlighting an obstacle, letter information such as a warning message, and the like.

Figure 3:
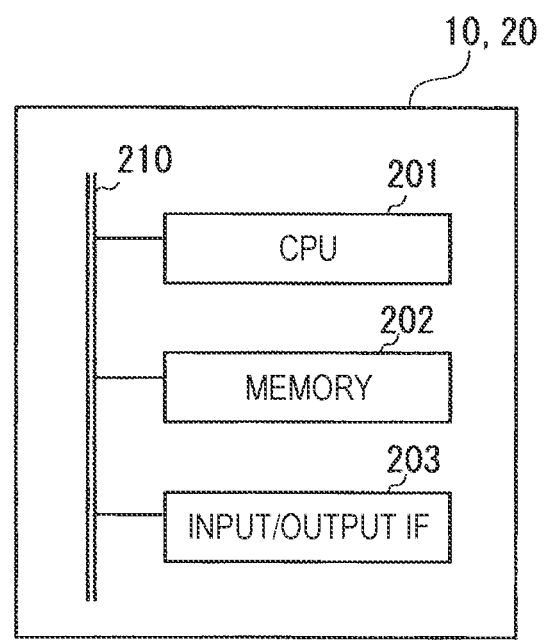
FIG. 3 depicts an example of a hardware configuration of a main microcomputer or a sub-microcomputer.

FIG. 3 depicts an example of a hardware configuration of the main microcomputer 10 or the sub-microcomputer 20. As shown in FIG. 3, the main microcomputer 10 or the sub-microcomputer 20 is a microcomputer including a CPU (Central Processing Unit) 201, a memory 202, and an input/output IF 203, which are connected to each other by a connection bus 210. The CPU 201 is a calculation processing device configured to process input information by executing a program. The CPU 201 is also referred to as a processor. However, the CPU 201 is not limited to a single processor and may have a multi-processor configuration. Also, the single CPU 201 connected with a single socket may have a multi-processor configuration.

The memory 202 includes a main storage device and an auxiliary storage device. The main storage device is used as a work area of the CPU 201, a storage area of a program and data, and a buffer area of communication data. The main storage device is configured by a Random Access Memory (RAM) or a combination of the RAM and a Read Only Memory (ROM), for example. The main storage device is a storage medium in which the CPU 201 stores a program and data or develops a work area. The main storage device includes a flash memory, a RAM (Random Access Memory) and a ROM (Read Only Memory), for example. The auxiliary storage device is a storage medium in which a program to be executed by the CPU 201, setting information of an operation, and the like are stored. The auxiliary storage device is an HDD (Hard-disk Drive), an SSD (Solid State Drive), an EPROM (Erasable Programmable ROM), a flash memory, a USB memory, a memory card and the like, for example.

The input/output IF 203 is an interface configured to input and output data to and from devices such as a sensor, an operation unit, an ECU and the like connected to the main microcomputer 10 or the sub-microcomputer 20. In the meantime, the constitutional elements may be respectively provided in plural or some of the constitutional elements may not be provided.

In the main microcomputer 10, the CPU 201 executes a program to thereby function as each processing unit such as the selection unit 11, the selection notification unit 12 and the additional information generation instruction unit 13 shown in FIG. 1. Also, in the sub-microcomputer 20, the CPU 201 executes a program to thereby function as each processing unit such as the communication controller 21 and the additional information generation unit 22 shown in FIG. 1. In the meantime, at least some processing of each processing unit may be provided by a DSP (Digital Signal Processor), an ASIC (Application Specific Integrated Circuit) and the like. Also, at least some of each processing unit may be a dedicated LSI (large scale integration) such as FPGA (Field-Programmable Gate Array), or the other digital circuit. Also, at least some of each processing unit may include an analog circuit.

<Display Control Method>

Figure 4:
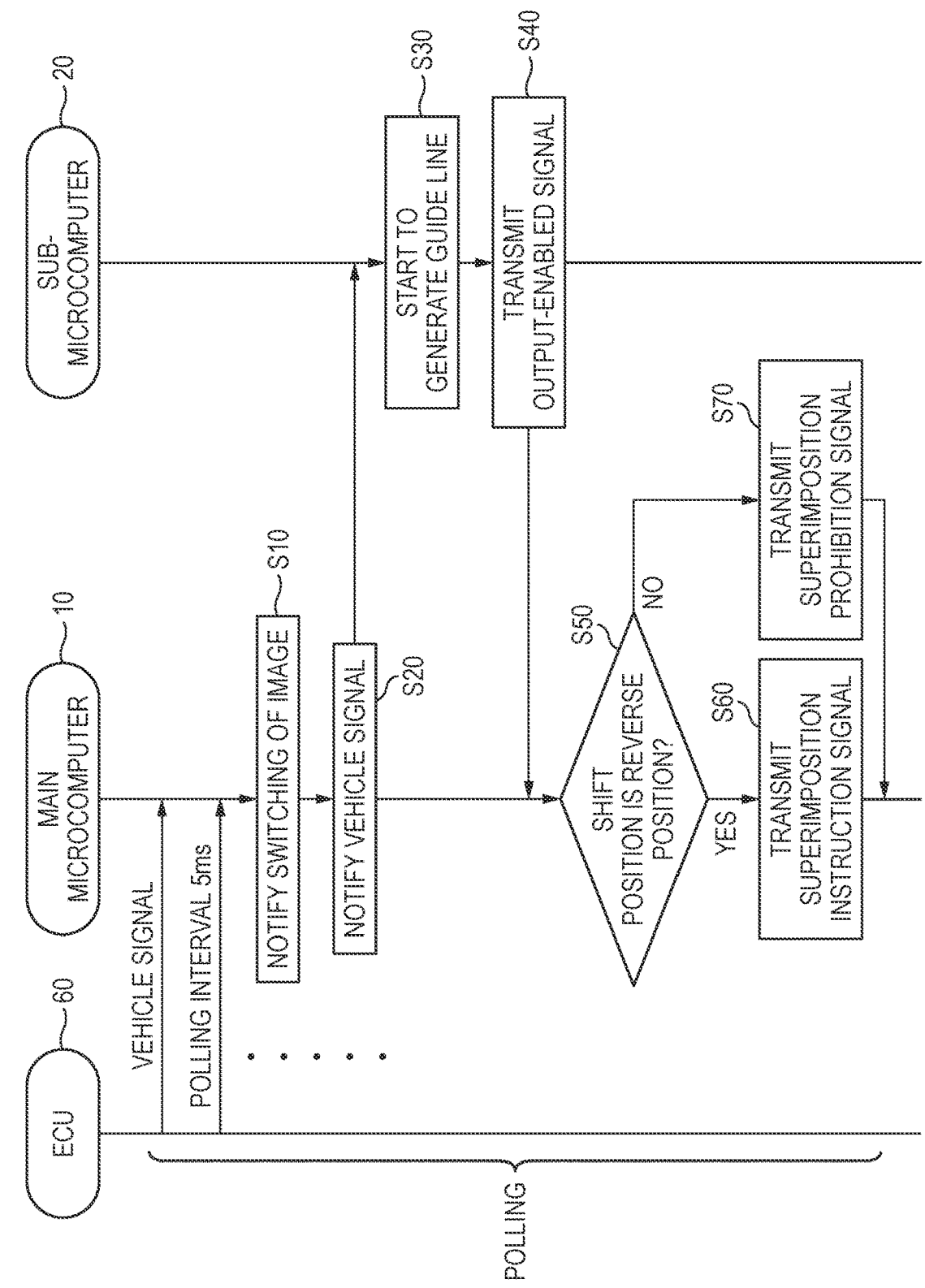
FIG. 4 depicts a processing sequence of a display control method that is executed by a display control device when a shift position becomes a reverse position.

FIG. 4 depicts a processing sequence of a display control method that is executed by the display control device 1 when the shift position becomes the reverse position. When an ACC (accessory) power supply 70 becomes ON, the main microcomputer 10 of the display control device 1 periodically acquires a vehicle signal by polling, and displays an image corresponding to the acquired vehicle signal on the display device 50. Accordingly, the display control device 1 performs control of, when the acquired vehicle signal changes, switching the display in correspondence to the changed vehicle signal. Meanwhile, in the first illustrative embodiment, when the shift position, which is the vehicle signal, is a position other than the reverse position, such as a drive and a parking, an image from the navigation apparatus 80 is displayed on the display device 50, and when the shift position is the reverse position, an image from the camera 40 is displayed on the display device 50.

As shown in FIG. 4, when it is recognized that the vehicle signal acquired by the polling is switched from a position other than the reverse position to the reverse position, the main microcomputer 10 selects a captured image output from the camera 40, and notifies the switching of image to the display driver 32 so as to display the captured image (step S10). The display driver 32 having received the notification of the switching of image mutes the image so as not to perform the display for a predetermined time period (for example, 500 ms) upon switching from an image other than the captured image to the captured image.

Also, the main microcomputer 10 notifies the sub-microcomputer 20 of the vehicle signal, which indicates that the shift position becomes the reverse position (step S20). The sub-microcomputer 20 having received the vehicle signal indicative of the reverse position starts to generate the guide line as the additional information (step S30). In this way, the main microcomputer 10 notifies the sub-microcomputer 20 of the vehicle signal indicative of the reverse position, so that the sub-microcomputer 20 generates the additional information. Therefore, in the first illustrative embodiment, the notification of the vehicle signal is an instruction signal for generating the guide line (the additional information).

Then, when an output of the generated guide line becomes possible, the sub-microcomputer 20 transmits an output-enabled signal to the main microcomputer 10 (step S40).

The main microcomputer 10 having received the output-enabled signal determines whether the shift position indicated by the vehicle signal, which is acquired when the output-enabled signal is received, of the vehicle signals acquired by the polling is the reverse position (step S50).

Here, when the shift position indicated by the vehicle signal, which is acquired when a superimposition start signal is received, is the reverse position (step S50, Yes), the main microcomputer 10 transmits a superimposition instruction signal to the decoder 31 (step S60) to superimpose the guide line on the captured image.

Also, when the shift position indicated by the vehicle signal, which is acquired when a superimposition start signal is received, is a position other than the reverse position (step S50, No), the main microcomputer 10 transmits the superimposition prohibition signal indicative of prohibition of the superimposition to the decoder 31 (step S70), thereby prohibiting the superimposition of the guide line by the decoder 31. Thereby, when the shift position is changed to a position other than the reverse position at a point of time at which the additional information can be output, the decoder 31 does not perform the superimposition, so that an abnormal display such as a display of the guide line with being superimposed on an image other than the captured image can be prevented.

Figure 5:
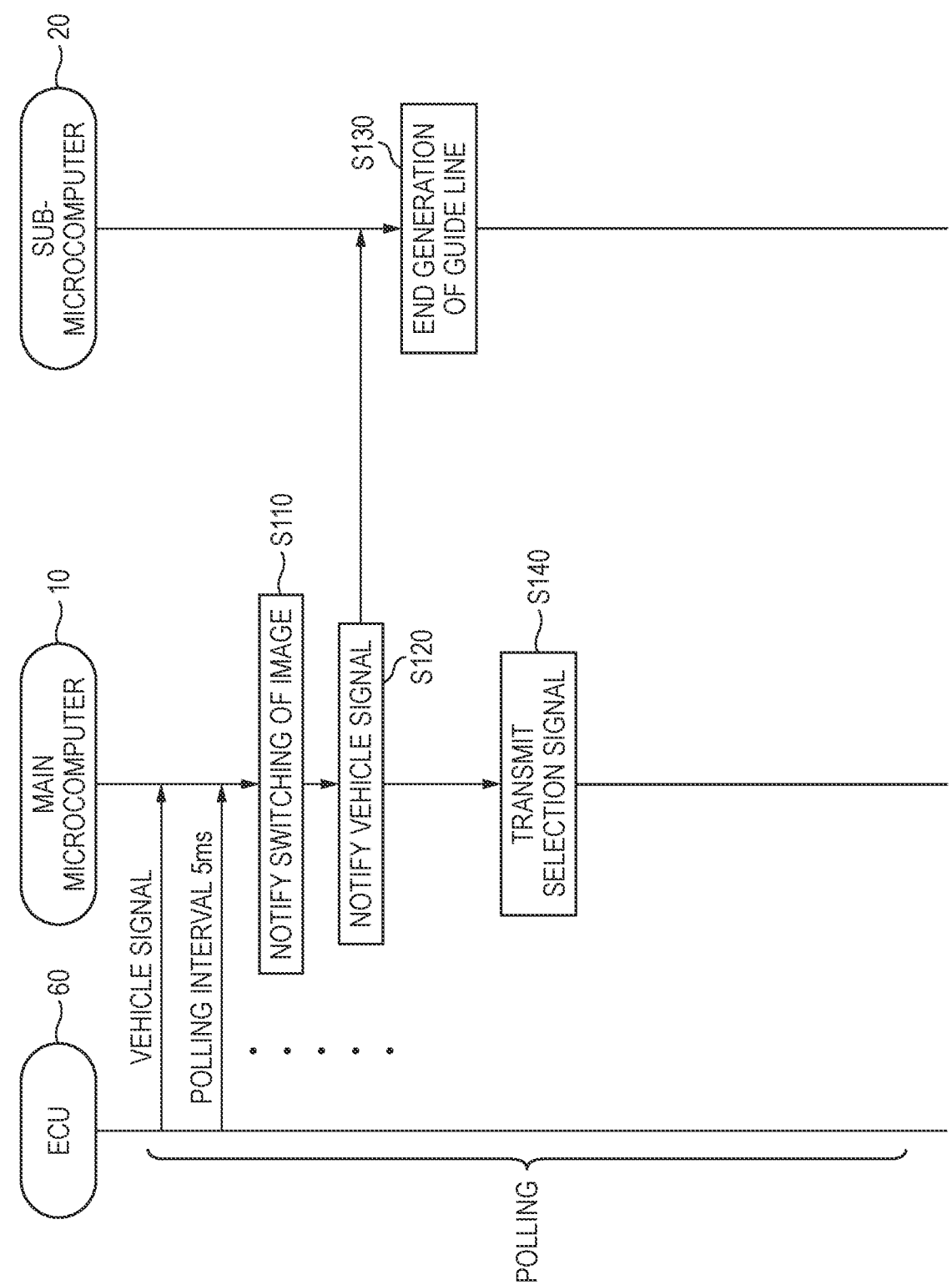
FIG. 5 depicts a processing sequence of the display control method that is executed by the display control device when a shift position becomes a position other than the reverse position.

FIG. 5 depicts a processing sequence of the display control method that is executed by the display control device 1 when the shift position becomes a position other than the reverse position.

As shown in FIG. 5, when it is recognized that the vehicle signal acquired by the polling is switched from the reverse position to a position other than the reverse position, the main microcomputer 10 notifies the switching of image to the display driver 32 (step S110), and enables the display driver 32 to mute the image so as not to perform the display for a predetermined time period (for example, 500 ms).

Also, the main microcomputer 10 notifies the sub-microcomputer 20 of the vehicle signal, which indicates that the shift position becomes a position other than the reverse position (step S120). The sub-microcomputer 20 having received the vehicle signal indicative of a position other than the reverse position ends the generation of the guide line as the additional information (step S130).

Then, the main microcomputer 10 transmits, to the decoder 31, a selection signal, which indicates that an image other than the captured image, for example, an image output from the navigation apparatus 80, in the first illustrative embodiment, is selected (step S140). Thereby, the decoder 31 displays an image output from the navigation apparatus 80, for example, a screen of an audio or a navigation displayed immediately before the switching to the captured image of the camera 40.

<Operations and Effects of Illustrative Embodiment>

As described above, the main microcomputer (the first processing unit) 10 of the display system 100 selects an image, which is supplied from a plurality of supply sources (the camera 40 and the navigation apparatus 80), on the basis of the vehicle signal, and when the traveling state of the vehicle indicated by the vehicle signal indicates the backward movement (predetermined state), instructs the second processing unit to generate the additional information and superimposes the guide line (the additional information), which is output from the sub-microcomputer (the second processing unit) 20, on the image and displays the same on the display device 50.

The display system 100 of the first illustrative embodiment checks whether the shift position indicated by the vehicle signal is the reverse position at a point of time at which the superimposition start signal is received, and prohibits the superimposition of the additional information (the guide line) when the shift position is changed to a position other than the reverse position.

By the above configuration, even though the shift position is changed in a short time and the additional information is thus output from the sub-microcomputer 20 at a point of time at which the shift position becomes a position other than the reverse position, since the decoder 31 does not perform the superimposition, the display system 100 of the first illustrative embodiment can prevent an abnormal display such as a display of the additional information with being superimposed on an image other than the captured image.

Second Illustrative Embodiment

Figure 6:
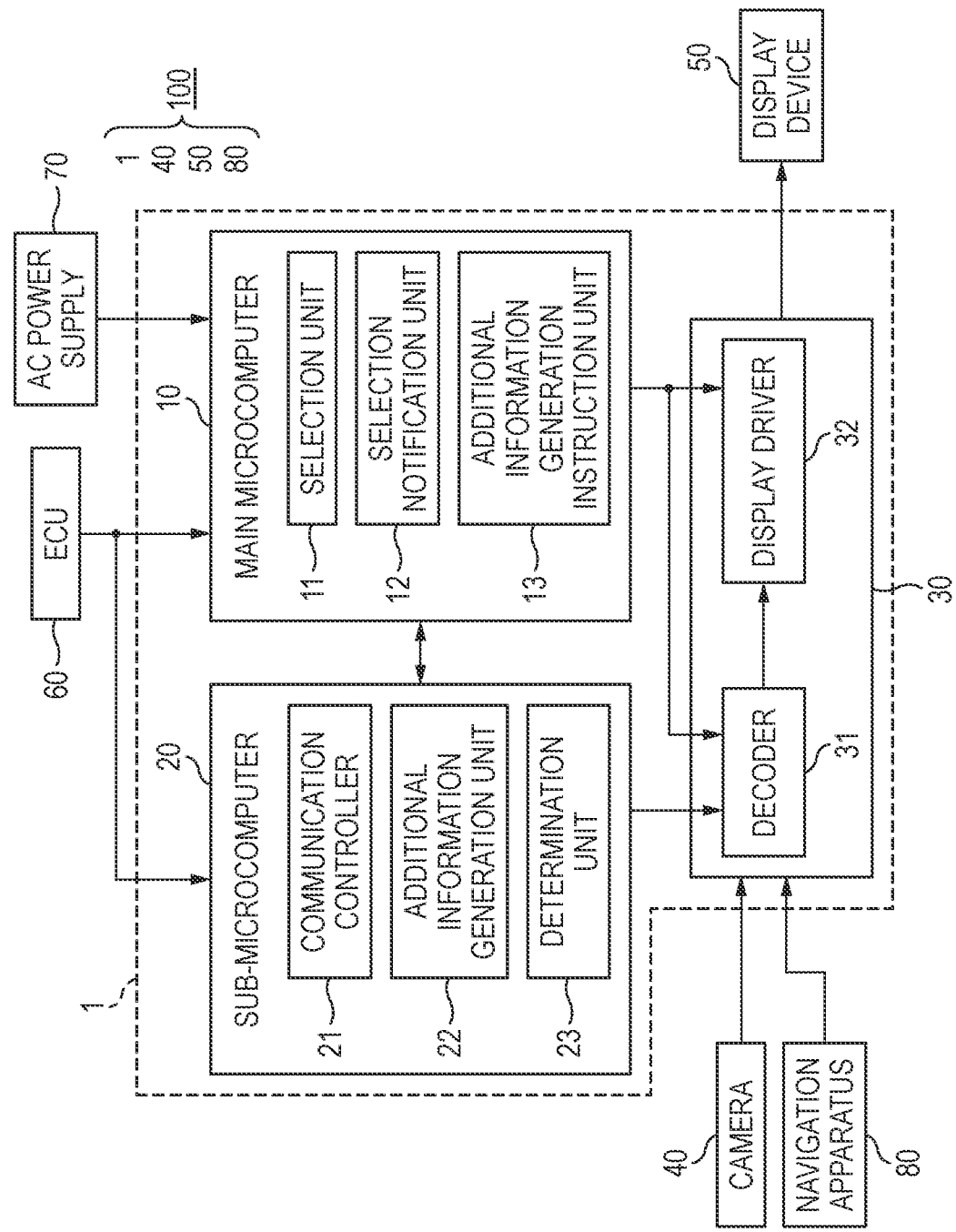
FIG. 6 is a block diagram depicting a configuration of a display system in accordance with a second illustrative embodiment.
Figure 7:
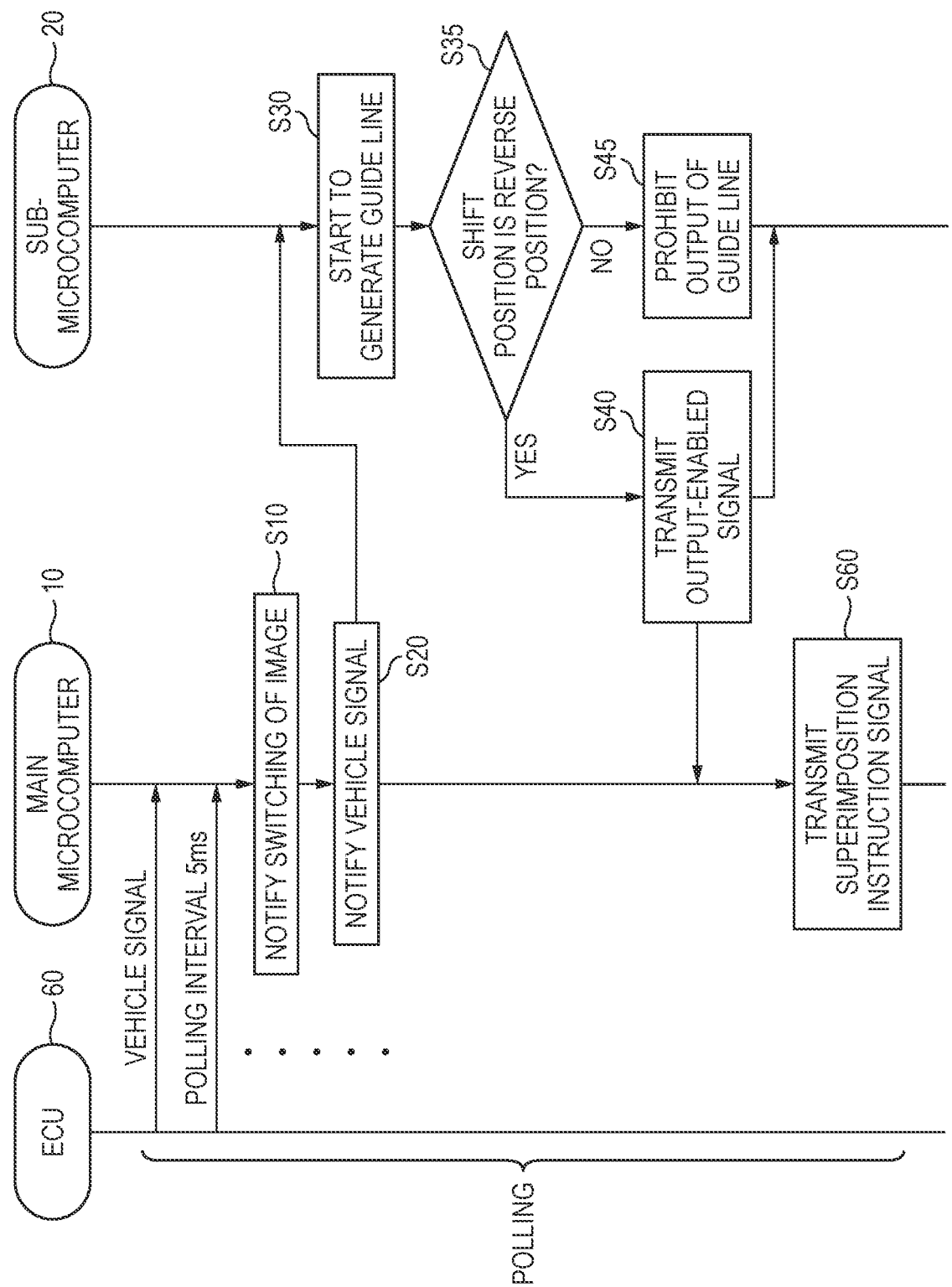
FIG. 7 depicts a processing sequence of a display control method that is executed by the display control device when the shift position becomes the reverse position, in the second illustrative embodiment.

FIG. 6 is a block diagram depicting a configuration of the display system 100 in accordance with a second illustrative embodiment, and FIG. 7 depicts a processing sequence of a display control method that is executed by the display control device 1 when the shift position becomes the reverse position, in the second illustrative embodiment. The second illustrative embodiment is different from the first illustrative embodiment, in that the sub-microcomputer 20 determines whether or not to superimpose the guide line (the additional information) in correspondence to the vehicle signal, and the other configurations are the same. For this reason, the same elements are denoted with the same reference numerals, and the overlapping descriptions are omitted.

As shown in FIG. 6, in the display system 100 of the first illustrative embodiment, the sub-microcomputer 20 includes a determination unit 23 configured to acquire the vehicle signal from the ECU 60, and to determine whether the traveling state of the vehicle indicated by the vehicle signal is a predetermined state, in other words, whether the shift position is the reverse position, and the other configurations are the same as FIG. 1.

As shown in FIG. 7, when it is recognized that the vehicle signal acquired by the polling is switched from a position other than the reverse position to the reverse position, the main microcomputer 10 of the second illustrative embodiment notifies the switching of image to the display driver 32 (step S10), and notifies the sub-microcomputer 20 of the vehicle signal, which indicates that the shift position becomes the reverse position (step S20), like FIG. 4.

The sub-microcomputer 20 having received the vehicle signal indicative of the reverse position starts to generate the guide line as the additional information (step S30).

Then, the sub-microcomputer 20 acquires a vehicle signal at a point of time at which the generated guide line can be output, and determines whether the shift position indicated by the vehicle signal is the reverse position (step S35).

Here, when the shift position is the reverse position (step S35, Yes), the sub-microcomputer 20 transmits the output-enabled signal to the main microcomputer 10 (step S40). Also, when the shift position is a position other than the reverse position (step S35, No), the sub-microcomputer 20 prohibits an output of the guide line (step S45), and does not transmit the output-enabled signal.

In the meantime, when the main microcomputer 10 receives the output-enabled signal, the main microcomputer 10 transmits the superimposition instruction signal to the decoder 31 (step S60) to superimpose the guide line on the captured image. On the other hand, when the main microcomputer 10 does not receive the output-enabled signal, the superimposition instruction signal is not transmitted to the decoder 31, so that the superimposition of the guide line is not performed.

As described above, in the display control device 1 of the second illustrative embodiment, the sub-microcomputer 20 includes the determination unit 23 configured to determine whether the shift position indicated by the vehicle signal is the reverse position, the determination unit 23 is configured to acquire the vehicle signal at a point of time at which the additional information can be output, and when it is determined that the shift position indicated by the vehicle signal is not the reverse position, the additional information generation unit 22 prohibits an output of the guide line (the additional image).

Thereby, even though the shift position is changed in a short time and the guide line is thus generated at a point of time at which the shift position becomes a position other than the reverse position, since the additional information generation unit 22 does not output the guide line, the display control device 1 of the second illustrative embodiment can prevent an abnormal display such as a display of the guide line with being superimposed on an image other than the captured image.

MODIFIED EMBODIMENTS

Although the illustrative embodiments of the present disclosure have been described, the illustrative embodiments are just exemplary, and the present disclosure is not limited thereto and can be diversely changed on the basis of the knowledge of one skilled in the art, without departing from the gist of the claims.

Modified Embodiment 1

In the above illustrative embodiments, when the shift position is the reverse position, the image captured by the camera 40 is displayed on the display device 50. However, the image that is to be displayed on the display device 50 may be an overhead view image converted from the captured image of the camera 40 by viewpoint conversion processing. Also, the image may be an image around the vehicle including the rear of the vehicle, which is obtained by synthesizing images of the rear camera, the side camera and the front camera. That is, the display control device may be configured to control whether or not superimpose the additional information (the guide line) on the overhead view image or the image around the vehicle, based on the vehicle signal.

Modified Embodiment 2

In the above illustrative embodiments, when the traveling state indicated by the vehicle signal is "backward movement", the guide line is superimposed on the image captured by the rear camera. However, in the present disclosure, the "predetermined state" of the traveling state is not limited to "backward movement". For example, when the traveling state is "forward movement", a guide line indicative of a forward traveling direction may be displayed in a captured image from the front camera or a synthesized image such as an overhead view image. In this case, the vehicle signal is a signal indicative of the shift position as the traveling state, for example.

When the shift position indicated by the vehicle signal is "backward movement", the main microcomputer 10 of modified embodiment 2 selects an image captured by the rear camera, as an image that is to be displayed on the display device 50, and instructs the sub-microcomputer 20 to generate a guide line indicative of a backward traveling direction, and when the shift position indicated by the vehicle signal is "forward movement", the main microcomputer 10 selects an image captured by the front camera, as an image that is to be displayed on the display device 50, and instructs the sub-microcomputer 20 to generate a guide line indicative of a forward traveling direction. Thereby, when a driver parks the vehicle while moving forward and backward the vehicle, the guide line indicative of the backward traveling direction and the guide line indicative of the forward traveling direction are switched and displayed, so that it is possible to assist the user's parking operation.

Like the first illustrative embodiment or the second illustrative embodiment, when the traveling state acquired at a point of time at which the guide line can be output is different from the traveling state at a point of time at which the generation of the additional information is instructed, the display system 100 of modified embodiment 2 prohibits at least one of the output of the guide line by the sub-microcomputer 20 and the superimposition of the guide line on the captured image. By this configuration, even though the shift position is changed in a short time, the display system 100 of modified embodiment 2 can prevent the guide line indicative of the forward traveling direction from being superimposed and displayed on the rear image or the guide line indicative of the backward traveling direction from being superimposed and displayed on the front image.

Meanwhile, in modified embodiment 2, the condition for instructing the generation of the forward guide line may include not only the condition that the shift position is a forward movement position but also a condition that a display of an image captured by the front camera is selected for parking or a vehicle speed is equal to or less than a predetermined value (for example, 5 km/h or less). Accordingly, the vehicle signal may include not only the signal (shift signal) indicative of the shift position but also a selection signal of an image to be displayed on the display device 50 or a vehicle speed signal. Thereby, during the usual traveling, the image captured by the front camera is not displayed, and during the parking, the image captured by the front camera can be displayed.

Modified Embodiment 3

In the above illustrative embodiments and modified embodiments, the traveling state indicated by the vehicle signal is "backward movement" or "forward movement". However, the traveling state of the present disclosure is not limited thereto and may be "right turn" or "left turn". In this case, the vehicle signal is information indicative of a steering angle or a signal indicative of an operation direction of a direction indicator (winker), for example, as the traveling state.

When a steering angle indicated by the vehicle signal is changed rightward or leftward from a straight advance position by a predetermined value (for example, 10°) or greater, or when a direction indicator is operated rightward or leftward, the main microcomputer 10 of modified embodiment 3 selects an image captured by the side camera, as an image to be displayed on the display device 50, and instructs the sub-microcomputer 20 to generate a guide line indicative of a rightward or leftward traveling direction.

Thereby, the main microcomputer 10 of modified embodiment 3 can assist the user's driving operation upon right or left turn.

Modified Embodiment 4

In the above illustrative embodiments and modified embodiments, the guide line is generated as the additional information that is to be generated by the sub-microcomputer 20, and is displayed with being superimposed on the captured image. However, the additional information of the present disclosure is not limited to the guide line.

For example, the additional information may be letter information for urging the driver to take precautions, such as "When parking, please check the area around the vehicle with cameras and naked eyes", which is to be superimposed on the rear image upon backward movement or "There is an obstacle in front of the vehicle", which is to be superimposed on the front image upon forward movement.

Also, the additional information may be a figure indicative of a direction of a tire of the own vehicle, which is to be superimposed on an overhead view image upon backward movement.

Also, the additional information may be a symbol such as an arrow indicative of a direction of a right obstacle detected by a clearance sonar, which is to be superimposed on a right image upon right turn, or a symbol such as an arrow indicative of a direction of a left obstacle detected by a clearance sonar, which is to be superimposed on a left image upon left turn.

Like this, the additional information may be a predetermined figure, symbol or letter to be superimposed on an image, which is to be selected in correspondence to the vehicle signal.

What is claimed is:

1. A display control device comprising:
    a first processing unit configured to select an image, which is to be displayed on a display device, of images to be supplied from a plurality of supply sources, based on a vehicle signal indicative of a shift position of a vehicle;
    a second processing unit configured to generate additional information to be displayed with being superimposed on the image in response to the shift position of the vehicle being switched to a reverse position from another position, the second processing unit being provided separately from the first processing unit; and
    a display controller configured to superimpose the additional information, which is output from the second processing unit, on the image selected by the first processing unit and to display both of the image and the additional information on the display device,
    wherein, in a case in which the shift position of the vehicle is changed in a short period of time and the shift position is not the reverse position when the additional information generated by the second processing unit becomes ready for output but before the additional information is superimposed on the image on the display device, at least one of an output of the additional information by the second processing unit and a superimposition of the additional information on the image by the display controller is prohibited, and
    when the vehicle signal indicates the reverse position, the first processing unit selects an image obtained by capturing a surrounding of the vehicle, as an image to be displayed on the display device, and the second processing unit generates a guide line indicative of a traveling direction of the vehicle, as the additional information.

2. The display control device according to claim 1, wherein the first processing unit is further configured to:
    acquire the vehicle signal and select the image to be displayed on the display device based on the vehicle signal;
    notify a result of selection to the display controller; and
    instruct the second processing unit to generate the additional information when the shift position of the vehicle indicated by the vehicle signal is the reverse position.

3. The display control device according to claim 1, wherein when a notification, which indicates that the additional information can be output from the second processing unit, is received, the first processing unit acquires the vehicle signal indicative of the shift position of the vehicle, and when the shift position of the vehicle indicated by the vehicle signal is not the reverse position, the first processing unit prohibits the display controller from superimposing the additional information on the image.

4. The display control device according to claim 1, wherein the second processing unit is further configured to:
    determine whether the shift position of the vehicle indicated by the vehicle signal is the reverse position, and
    acquire the vehicle signal indicative of the shift position of the vehicle at a point of time at which the additional information can be output, and when it is determined that the shift position of the vehicle indicated by the vehicle signal is not the reverse position, the first processing unit prohibits the output of the additional information.

5. A display control method that is to be executed by a display control device, the method comprising:
    selecting an image by a first processing unit, which is to be displayed on a display device, of images to be supplied from a plurality of supply sources, based on a vehicle signal indicative of a shift position of a vehicle;
    generating additional information to be displayed with being superimposed on the image, by a second processing unit provided separately from the first processing unit, in response to the shift position of the vehicle being switched to a reverse position from another position, and
    superimposing the additional information using a display controller, which is output from the second processing unit, on the image selected by the first processing unit and displaying both of the image and the additional information on the display device,
    wherein, in a case in which the shift position of the vehicle is changed in a short period of time and the shift position is not the reverse position when the additional information generated by the second processing unit becomes ready for output but before the additional information is superimposed on the image on the display device, at least one of an output of the additional information by the second processing unit and a superimposition of the additional information on the image by the display controller is prohibited, and when the vehicle signal indicates the reverse position, the first processing unit selects an image obtained by capturing a surrounding of the vehicle, as an image to be displayed on the display device, and the second processing unit generates a guide line indicative of a traveling direction of the vehicle, as the additional information.

6. The display control method according to claim 5, wherein the first processing unit is configured to execute a process, the process comprises:

acquiring the vehicle signal and selecting the image to be displayed on the display device based on the vehicle signal;

notifying a result of selecting to the display controller; and instructing the second processing unit to generate the additional information when the shift position of the vehicle indicated by the vehicle signal is the reverse position.

\* \* \* \* \*